(12) United States Patent
Shigeta

(10) Patent No.: US 11,055,955 B2
(45) Date of Patent: Jul. 6, 2021

(54) TABLE GAME MANAGEMENT SYSTEM, GAME TOKEN, AND INSPECTION APPARATUS

(71) Applicant: ANGEL PLAYING CARDS CO., LTD., Shiga (JP)

(72) Inventor: Yasushi Shigeta, Shiga (JP)

(73) Assignee: ANGEL PLAYING CARDS CO., LTD., Shiga (JP)

( * ) Notice: Subject to any disclaimer, the term of this patent is extended or adjusted under 35 U.S.C. 154(b) by 0 days.

(21) Appl. No.: 16/590,647

(22) Filed: Oct. 2, 2019

(65) Prior Publication Data

US 2020/0035060 A1 Jan. 30, 2020

Related U.S. Application Data

(62) Division of application No. 15/777,351, filed as application No. PCT/JP2016/084179 on Nov. 17, 2016, now Pat. No. 10,600,279.

(30) Foreign Application Priority Data

Nov. 19, 2015 (JP) ................................. 2015-240631

(51) Int. Cl.
*G07F 17/32* (2006.01)
*A63F 3/00* (2006.01)
(Continued)

(52) U.S. Cl.
CPC ............ *G07F 17/322* (2013.01); *A44C 21/00* (2013.01); *A63F 1/14* (2013.01); *A63F 1/18* (2013.01);
(Continued)

(58) Field of Classification Search
CPC .... G07F 17/3248; G06K 19/047; A44C 21/00
See application file for complete search history.

(56) References Cited

U.S. PATENT DOCUMENTS 3,968,582 A * 7/1976 Jones ..................... A44C 21/00
40/27.5
3,983,646 A 10/1976 Howard
(Continued)

FOREIGN PATENT DOCUMENTS

CN 1162926 10/1997
CN 1639729 A 7/2005
(Continued)

OTHER PUBLICATIONS

Japanese Office Action dated Feb. 19, 2019 issude in corresponding/family Japanese Application No. 2018-078952.
(Continued)

*Primary Examiner* — Corbett B Coburn
(74) *Attorney, Agent, or Firm* — Norton Rose Fulbright US LLP

(57) ABSTRACT

A table game management system according to the present invention includes: a camera that images a game token placed on a game table; and a management control device that grasps a type (10 points, 20 points, 100 points, 1,000 points, or the like) of the game token placed on the game table based on a color of a side face of the game token imaged by the camera.

15 Claims, 8 Drawing Sheets

(51) Int. Cl.
    *A44C 21/00*     (2006.01)
    *A63F 1/14*     (2006.01)
    *A63F 1/18*     (2006.01)
    *A63F 11/00*     (2006.01)
    *B42D 25/382*     (2014.01)
    *G06K 19/04*     (2006.01)
    *A63F 9/24*     (2006.01)

(52) U.S. Cl.
    CPC ...... *A63F 3/00157* (2013.01); *A63F 11/0002* (2013.01); *B42D 25/382* (2014.10); *G06K 19/047* (2013.01); *G07F 17/32* (2013.01); *G07F 17/3241* (2013.01); *G07F 17/3248* (2013.01); *A63F 2003/00164* (2013.01); *A63F 2009/2419* (2013.01); *A63F 2009/2489* (2013.01); *A63F 2011/0006* (2013.01); *A63F 2250/58* (2013.01); *G07F 17/3293* (2013.01)

(56) References Cited

U.S. PATENT DOCUMENTS

| | | | |
|---|---|---|---|
| 4,026,309 A | 5/1977 | Howard | |
| 4,814,589 A | 3/1989 | Storch et al. | |
| 5,361,885 A | 11/1994 | Modler | |
| 5,673,503 A | 10/1997 | Rendleman | |
| 5,757,876 A | 5/1998 | Dam et al. | |
| 5,781,647 A | 7/1998 | Fishbine et al. | |
| 5,941,769 A | 8/1999 | Order | |
| 6,254,002 B1 | 7/2001 | Litman | |
| 6,264,109 B1 | 7/2001 | Chapet et al. | |
| 6,533,662 B2 | 3/2003 | Soltys et al. | |
| 2002/0024439 A1 | 2/2002 | Kawai | |
| 2002/0042298 A1 | 4/2002 | Soltys et al. | |
| 2003/0174864 A1 | 9/2003 | Lindquist | |
| 2003/0220136 A1 | 11/2003 | Soltys et al. | |
| 2004/0026520 A1 | 2/2004 | Kawai | |
| 2005/0051965 A1 | 3/2005 | Gururajan | |
| 2006/0019739 A1 | 1/2006 | Soltys et al. | |
| 2006/0160608 A1 | 7/2006 | Hill et al. | |
| 2007/0060304 A1 | 3/2007 | Jeon | |
| 2007/0105616 A1 | 5/2007 | Chapet et al. | |
| 2007/0184898 A1 | 8/2007 | Miller et al. | |
| 2007/0278314 A1 | 12/2007 | Chapet | |
| 2009/0075725 A1 | 3/2009 | Koyama | |
| 2011/0052049 A1 | 3/2011 | Rajaraman et al. | |
| 2013/0071014 A1 | 3/2013 | Rajaraman et al. | |
| 2013/0126602 A1 | 5/2013 | Thorson et al. | |
| 2014/0200071 A1 | 7/2014 | Czyzewski et al. | |
| 2014/0345173 A1 | 11/2014 | Bretz | |
| 2019/0168110 A1 | 6/2019 | Moore et al. | |

FOREIGN PATENT DOCUMENTS

| | | |
|---|---|---|
| CN | 102039048 A | 5/2011 |
| CN | 102892472 A | 1/2013 |
| DE | 202007008535 U1 | 10/2007 |
| JP | S64-500243 A | 2/1989 |
| JP | 06-134140 A | 5/1994 |
| JP | 2000-259796 A | 9/2000 |
| JP | 2002-007989 A | 1/2002 |
| JP | 2008-077140 A | 4/2008 |
| JP | 2009-066173 A | 4/2009 |
| JP | 2011-067339 A | 4/2011 |
| JP | 2013-198626 A | 10/2013 |
| JP | 2014-140576 A | 8/2014 |
| WO | 8706372 A1 | 10/1987 |
| WO | 2014/182306 A1 | 11/2014 |
| WO | 2015/107902 A1 | 7/2015 |

OTHER PUBLICATIONS

International Application No. PCT/JP2016/084179, International Search Report dated Feb. 7, 2017.

European Application No. 16866413.4, European Search Report dated Jun. 4, 2019.

Japanese Application No. 2016-236224, Japanese Office Action dated Jul. 16, 2019.

* cited by examiner

TABLE GAME MANAGEMENT SYSTEM, GAME TOKEN, AND INSPECTION APPARATUS

CROSS-REFERENCE TO RELATED APPLICATIONS

This application is a divisional application from U.S. application Ser. No. 15/777,351 filed May 18, 2018, which is a national phase application under 35 U.S.C. § 371 of International Application No. PCT/JP2016/084179 filed Nov. 17, 2016, which claims priority to Japanese Application No. 2015-240631 filed Nov. 19, 2015, wherein the entire contents of each is specifically incorporated by reference herein without disclaimer.

TECHNICAL FIELD

The present invention relates to a table game management system, a game token, and an inspection apparatus in a game arcade.

In game halls such as casinos, various attempts have been made to prevent dealers from mishandling game tokens (chips). Game halls are equipped with surveillance cameras for monitoring the mishandling of chips by dealers to, for example, determine mishandling and fraud in collecting game tokens and distributing game tokens as a reward contradicting win-loss results on the basis of images obtained from the surveillance cameras, thereby preventing mishandling and fraud.

On the other hand, there has been proposed a technique of grasping the number and total amount of bet game tokens by attaching an IC tag to each game token to grasp the amount of the game token.

The card game monitoring system disclosed in WO 2015/107902 is designed to determine whether the game tokens placed on a game table have been collected or distributed as a reward according to win-loss results, by image analysis of the movements of the game tokens, thereby monitoring the mishandling of chips by the dealer.

In a game arcade such as a casino, gaming substitute currencies are bulky stacked on each other and placed on a game table. In such a situation, there is a difficulty in that the total amount cannot be read accurately with a reading device for an integrated circuit (IC) tag provided under the game table. When the sensitivity of the reading device is increased, there is a problem that a game token placed at a different position (win or lose depends on the position) is added up and the total amount of gaming substitute currencies at each position cannot be grasped. Moreover, conventionally, a game token (chip) T has a complicated design as illustrated in FIG. 2 and there is a problem that, when a large number of chips are stacked, the number of stacked chips cannot be accurately grasped by a camera.

In addition, the fraud in the game table has become further sophisticated and a new problem that the camera cannot find a fraud such as one by an advanced betting method is also grasped, as such a problem cannot be found through the detection of the fact that, for example, simply a large amount is won in a specific game table.

Meanwhile, a dealer needs to collect or redeem the game token placed on the game table in accordance with the result of win or lose. Even if it is attempted to judge this task by analyzing the image of the chip, since the game token (chip) has a complicated design, it is difficult for an existing practical image analysis technology to judge whether the dealer correctly redeems chips corresponding to betted chips at the time of redemption and there has been a problem that mistake prevention is not sufficient.

SUMMARY OF INVENTION

In order to solve the above problems, the table game management system according to the invention of the present application is a table game management system including: a camera that images a game token placed on a game table; and a management control device that grasps a type of the game token placed on the game table based on a color of a side face of the game token imaged by the camera.

In the table game management system described above, a pattern made up of a first color different according to a type of the game token and a second color not depending on the type of the game token may be formed on the side face of the game token, and the management control device may grasp the type of the game token based on the first color.

In the table game management system described above, the first color may be continuous in a circumferential direction.

In the table game management system described above, the second color may be continuous in a circumferential direction.

In the table game management system described above, the side face of the game token may have a portion whose color changes in a thickness direction.

In the table game management system described above, a striped pattern made up of a layer characterized by a first color different according to a type of the game token and a layer characterized by a second color not depending on the type of the game token may be formed on the side face of the game token, and the management control device may be equipped with a function of measuring the number of the layers characterized by the first color or the layers characterized by the second color of the game token and judging the number of the gaming substitute currencies.

In the table game management system described above, the game table may be equipped with a chip tray that holds the game token, and the management control device may grasp a type of the game token held in the chip tray captured by the camera.

In order to solve the above problems, the game token according to the present invention is a game token having a side face on which a pattern made up of a first color different according to a type of the game token and a second color not depending on the type of the game token is formed.

In the game token described above, the first color may be continuous in a circumferential direction.

In the game token described above, the second color may be continuous in a circumferential direction.

In the game token described above, the side face of the game token may have a portion whose color changes in a thickness direction.

In the game token described above, a striped pattern made up of a layer characterized by the first color and a layer characterized by the second color may be formed on the side face.

In the game token described above, layers characterized by the second color may be arranged on both sides of a layer characterized by the first color.

The game token described above may have a plurality of layers characterized by the first color.

The game token described above may be obtained by laminating a plastic layer of the first color and a plastic layer of the second color.

In the game token described above, the plastic layer of the first color and the plastic layer of the second color may be compressively bonded by thermocompression bonding.

In the game token described above, a sign representing a type of the game token may be made on the side face.

In the game token described above, the sign may be made by ultraviolet (UV) ink or carbon black ink.

In the game token described above, a transparent layer may be provided on an outermost layer.

In the game token described above, an embossing process may be applied to the transparent layer.

In the game token described above, a rounding (R) process may be applied to an end of the transparent layer.

A radio frequency identification (RFID) may be embedded in the game token described above.

In order to solve the above problems, the inspection apparatus configured to inspect the game token according to the present invention is an inspection apparatus including: a first judging means that captures an image of a side face of the game token and judges a type of the game token based on a color of the side face; a second judging means that judges the type of the game token by a method different from the method of the judging device; and an inspection means that inspects whether the type judged by the first judging device matches the type judged by the second judging means.

According to the table game management system of the present invention, since the type of the game token placed on the game table is grasped based on the color of the side face of the game token imaged by the camera, it is possible to grasp the type of each game token even when a plurality of gaming substitute currencies is stacked up.

DESCRIPTION OF EMBODIMENTS

Figure 1:
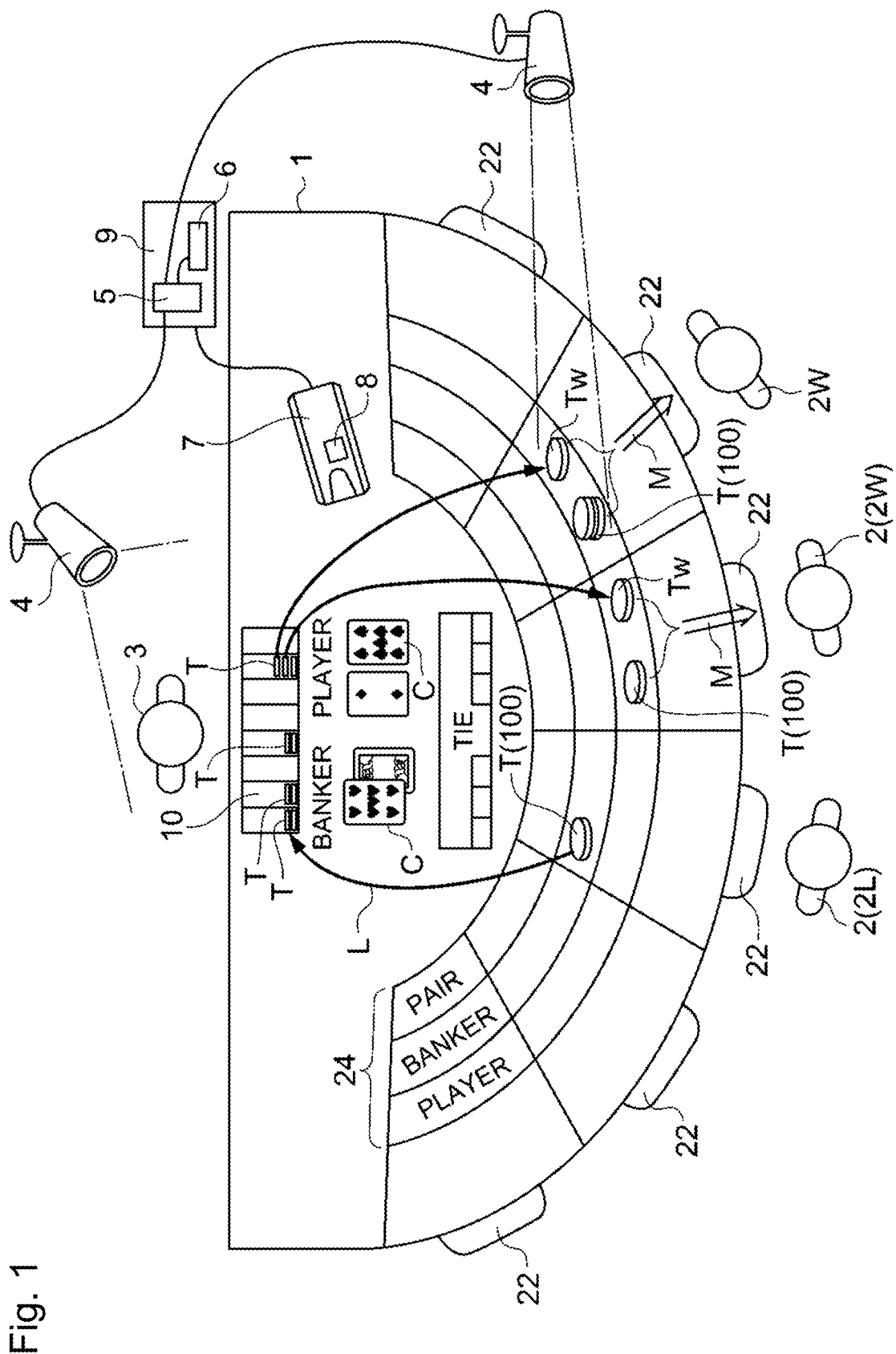
FIG. 1 is a plan view illustrating an outline of an overall table game management system in a game hall according to an embodiment of the present invention.

A table game management system in a game hall having game tables according to an embodiment of the present invention will be described below. FIG. 1 illustrates an overall outline of the system. The table game management system in a game hall having a plurality of game tables 1 includes a measurement device 6 including an image analysis device 5 that records the progress state of a game played on the game table 1, including game participants 2 and a dealer 3, as a video, via a plurality of cameras 4, and also performs image analysis on the recorded video of the progress state of the game, and a card distributor 7 that determines and displays win-loss results on each game on the game table 1. The card distributor 7 has been used and known by a person skilled in the art. The card distributor is a so-called electronic shoe, in which game rules are programmed in advance to determine a win or loss on the game by reading the information (rank and suite) of a distributed card C. In playing the Baccarat game, a banker's win, player's win, and tie (draw) are basically determined on the basis of the ranks of two or three cards, and a display lamp 8 displays the determination results (win-loss results).

A management control device 9 reads the information (rank and suite) of the card C obtained from the card distributor 7 and determines a win-loss result on each game. The management control device 9 also determines winners 2W and a loser 2L of the participants 2 in each game by using measurement results on the positions, types, and number of game tokens 100 (chips T) placed by the game participants 2. The management control device 9 also has a calculation function of calculating, for each game, a casino-side balance on the game table 1 (the amount obtained by subtracting the total amount of the game tokens 100 (chips T) distributed as a reward to the winners 2W of the participants 2 from the total amount of the game tokens 100 (chips T) bet by the loser 2L).

The image analysis device 5, the measurement device 6, and the management control device 9 in this detection system each have a composite structure including a computer, program, and memory in an integrated or discrete form.

Figure 3:
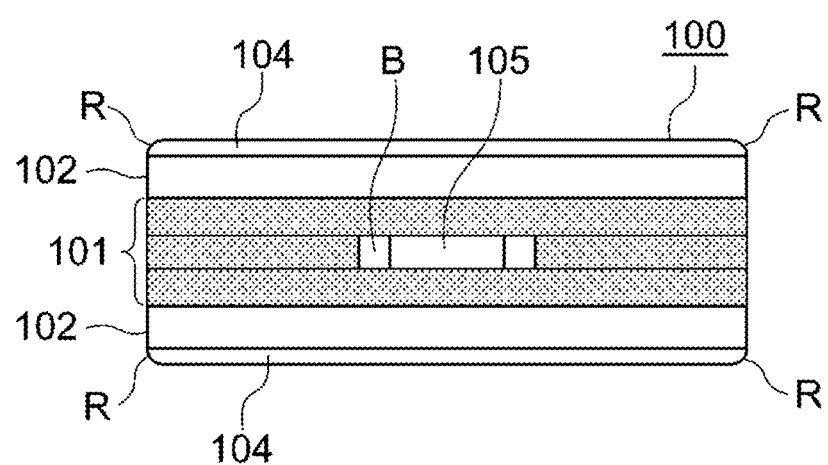
FIG. 3 is a front sectional view of a game token according to the embodiment of the present invention.
Figure 5A:
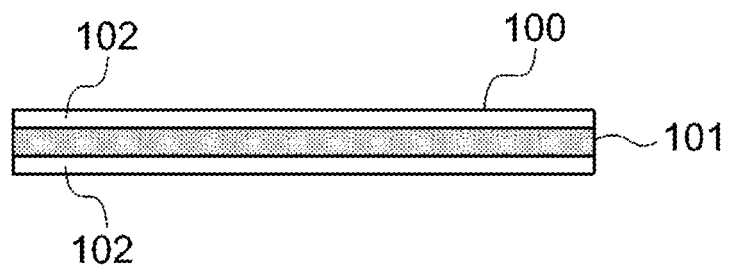
FIG. 5A is a front view of a game token according to the embodiment of the present invention.

A game token (chip) used in this detection system will be described in detail next. FIG. 3 is a front sectional view of the game token (chip T) 100 used in the detection system. This game token has a multi-layer structure having a plurality of plastic layers with a plurality of different colors stacked on each other. This multi-layer structure includes a colored layer 101 provided at least intermediately, with white layers 102 or light-colored layers (although not illustrated, any layers lighter in color than the colored layer 101) being stacked on the two sides of the colored layer 101. As described above, the game token includes the colored layer 101 and has the white layers 102 or light-colored layers (although not illustrated, any layers lighter in color than the colored layer 101) stacked on the two sides of the colored layer 101, thus forming a multi-layer structure. As illustrated in FIG. 5A, this forms a striped pattern on a side surface in the stacking direction. Changing the color of the colored layer 101 (to red, green, yellow, blue, or the like) makes it possible to identify the type of game token 100 (for example, 10 points, 20 points, 100 points, and 1,000 points).

Figure 5B:
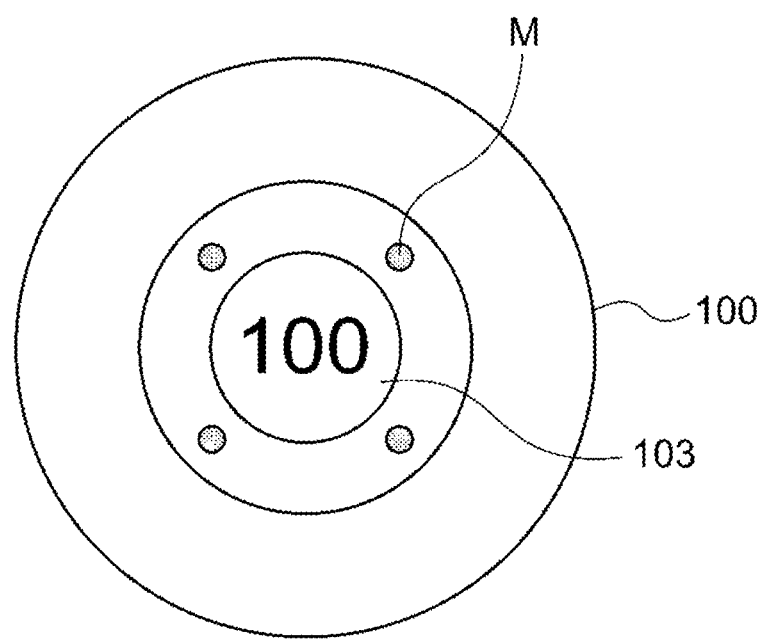
FIG. 5B is a plan view of a game token according to the embodiment of the present invention.

In addition, as illustrated in FIG. 5B, prints 103 (indicating 100 points or the like) indicating the type of game token 100 are formed on the surfaces (upper and lower surfaces) of the white layer 102 of the game token 100, and transparent layers 104 are provided on the outermost layers. The respective layers are bonded to each other by thermal compression to form at least a five-layer structure. Each game token 100 is formed by bonding the respective layers (the colored layer 101, the white layers 102, and the transparent layers 104), each formed from an elongated plastic material, by thermal compression into a tightly bonded structure (for example, a five-layer structure) and then punching it into, for example, a circular or rectangular shape using a press or like. When this structure is punched by a press, the dimensions of the die and punch used for punching are designed to provide R chamfering (round edges) to the edges of the transparent layers 104 on the outermost layers.

In addition, the surfaces of the white layer 102 of the game token 100 are provided with marks M printed by UV ink or carbon black ink. The marks M authenticate the game token 100. The marks M are visible when irradiated with ultraviolet light (or infrared light). A combination of the shape and number of such marks implements authentication. The transparent layers 104 are formed on the outermost layers by thermal compression bonding or a coating process (application) so as to cover the prints 103 and the marks M. The transparent layers 104 are embossed to prevent the game tokens 100 from clinging to each other.

The edges of the transparent layers 104 on the outermost layers, which are provided with the prints 103 (indicating 100 points or the like), are R-chamfered (R) to prevent the surfaces of the white layers 102 from being deformed and exposed from the side surface in a punching process for the game token 100. This also prevents the game token 100 from damaging the hands and other chips T with sharp edges that are left unchamfered.

As illustrated in FIG. 3, the colored layer 101 may be formed from a plurality of colored layers (three layers in FIG. 3). Because the plurality of colored layers (three layers in FIG. 3) are bonded to each other by thermal compression, the three-layer structure cannot be visually recognized unlike in FIG. 3. That is, FIG. 3 illustrates the three layers for the sake of descriptive convenience. In addition, a hollow portion B is provided in part of the intermediate layer of the three layers of the colored layer 101, and an RFID is embedded in the hollow portion.

The management control device 9 captures images of the game tokens 100 placed by the participants 2 in a game on the game table 1 by using the camera 4, and performs measurement for each area 24, on which the game tokens are placed, (to detect whether the participant has bet on the banker, player, pair ("PAIR"), or tie ("TIE")) by using the measurement device 6 including the image analysis device 5. In addition, the management control device 9 determines the types and number of game tokens 100 (chips T) stacked on each area by causing the measurement device 6 (using the information obtained by the image analysis device 5) to analytically measure the number and colors of the colored layers 101 (or light-colored layers) or the white layers 102 of the game tokens 100.

The management control device 9 may be a control device using artificial intelligence or having a deep learning structure. The management control device 9 can grasp, via the camera 4 and the image analysis device 5, the positions 24 (each position indicating whether the corresponding participant has bet on the player, banker, or pair), types (different amounts are assigned to the game tokens 100 for the respective colors), and numbers of game tokens T bet by the respective participants 2. A computer or control system using artificial intelligence and a deep learning (structure) technique can grasp the positions 24 (each position indicating whether the corresponding participant has bet on the player, banker, or pair), types (different amounts are assigned to the game tokens for the respective colors), and numbers of the game tokens T by using a self-learning function or the like. This allows the management control device 9 to determine, on the basis of analysis on each video indicating the progress state of each game via the image analysis device 5, whether the game token 100 bet by the participant 2L who has lost the game has been properly collected (indicated by an arrow L) and the game tokens 100 have been properly distributed as a reward to the participants 2W who have won the game in accordance with the win-loss results on the game determined by the card distributor 7.

Figure 2:
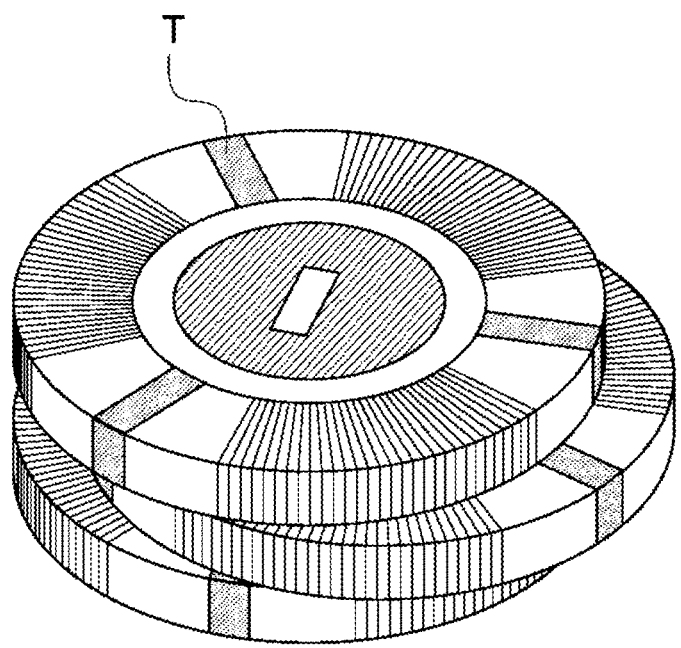
FIG. 2 is a perspective view of conventional game tokens.
Figure 4:
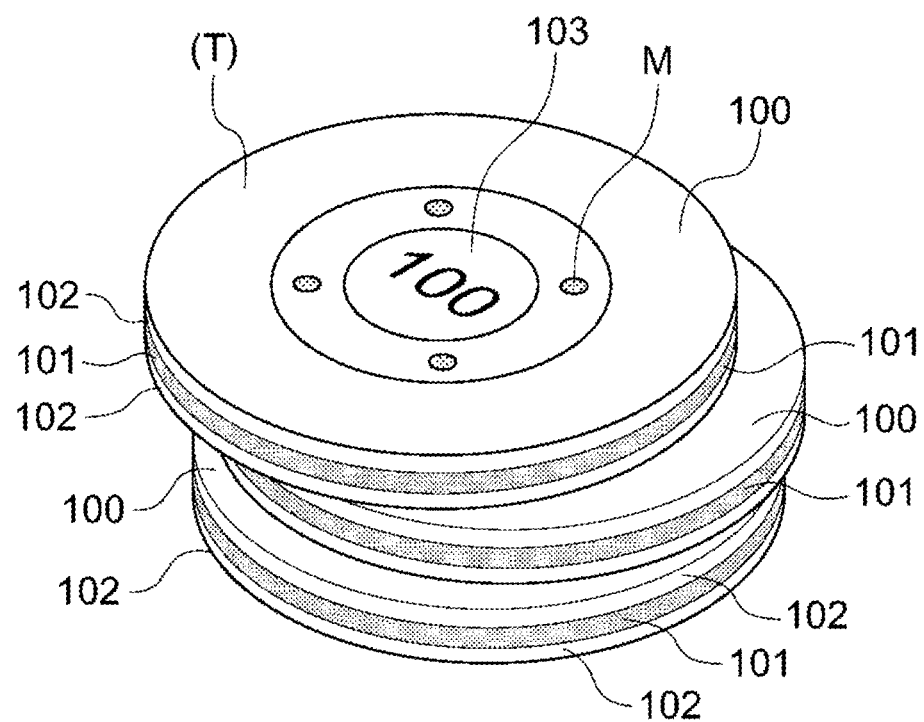
FIG. 4 is a perspective view illustrating a stacked state of game tokens which is grasped according to the embodiment of the present invention.
Figure 7:
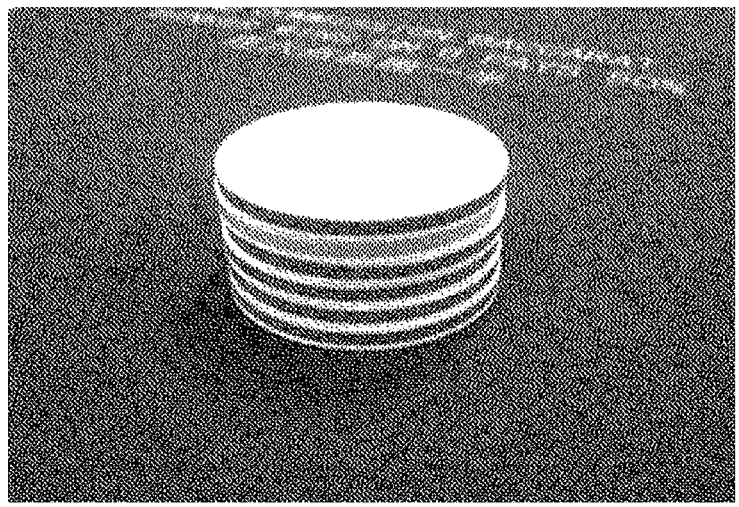
FIG. 7 is a perspective photographic view for explaining a stacked state of different types of game tokens according to the embodiment of the present invention.

In such a case, as illustrated in FIG. 4, each chip has a multilayer structure having stacked layers (as compared with the conventional chip illustrated in FIG. 2), with a stripe pattern being sharply formed on the side surface in the stacking direction, and hence the measurement device 6 including the image analysis device 5 can easily and correctly measure the types and number of chips. Additionally, Fig. 7 is a perspective photographic view for explaining a stacked state of different types of game tokens according to the embodiment of the present invention. In addition, using a computer or control system using artificial intelligence or a deep learning (structure) technique makes it possible to implement more correct image analysis and determination. Because the computer or control system using artificial intelligence and the deep learning (structure) technique have already been known by a person skilled in the art, and are available, a detailed description of them will omitted.

The management control device 9 can analytically grasp the total amount of the game tokens T in a game token tray 10 of the game table 1 which belongs to the dealer 3 by using the image analysis device 5. After balance settlement at the end of a given game, the management control device 9 can comparatively calculate, on the basis of win-loss results on the game, whether the total amount of the game tokens T in the game token tray 10 has increased or decreased, in accordance with the collection of the game tokens T bet by each participant 2 who has lost the game and a redemption amount TW of the game tokens bet by the game participants 2W who have won the game. Although the total amount of the game tokens T in the game token tray 10 is always grasped by means such as RFIDs, the management control device 9 determines whether an increase or decrease in the total amount is correct, by analyzing a video representing the progress state of a game via the image analysis device 5. These operations may also be performed by using an artificial intelligence structure or deep learning structure.

The management control device 9 may have an artificial intelligence structure or deep learning structure that can grasp the position of a game token bet at each play position 22 on the game table 1 (each position indicating whether the corresponding participant has bet on the player, banker, or pair) and an amount (the types and number of game tokens), and can extract a peculiar situation (set by the casino) by comparing the win-loss history of each game participant 2 and the obtained amount of game tokens (winning amount) obtained from a win-loss result on each game with the statistical data of many past games (big data). Typically, the management control device 9 having such an artificial intelligence structure or deep learning structure can extract, as peculiar situations, a situation in which a winning amount has exceeded a certain amount (million dollars) and a situation in which the amounts of game tokens lost are small and the amounts of game tokens won are large at a given one of the positions 22 on the game table 1 over several consecutive games as compared with the statistical data (big data or the like) of past games.

The management control device 9 has a structure capable of comparatively calculating the total amount of the game tokens 100 in the game token tray 10 of the game table 1 which belongs to the dealer 3 so as to indicate, after balance settlement of the game tokens 100 bet by the respective participants 2 in each game, whether the calculated increase or decrease in the amount of game tokens corresponds to the balance settlement is correct. In the chip tray 10 for holding the game tokens 100 of the dealer 3 illustrated in FIG. 1, the types and number of game tokens 100 can be determined by causing the measurement device 6 (using the information obtained by the image analysis device 5) to analytically measure the number and colors of the colored layers 101 or white layers 102 of the game tokens 100 (chips T) stacked in the lateral direction. The total amount of the game tokens 100 in the chip tray 10 for holding chips is always (or at predetermined time intervals) grasped in this manner. The management control device 9 has a calculation function of performing, for each game, calculation of the settled amount of each game (casino-side balance calculation on the game table 1 (the amount obtained by subtracting the total amount of game tokens 100 (chips T) distributed as a reward to the winners 2W of the participants 2 from the total amount of game tokens 100 (chips T) bet by the loser 2L)) (see paragraph 0018). This makes it possible to always (or at predetermined time intervals) verify the total amount of the game tokens 100 in the game token tray 10. That is, it is verified whether an increase or decrease in the amount of game tokens matches the settled amount of each game on the basis of the image analysis result dealer 3 obtained by the image analysis device 5.

Figure 6:
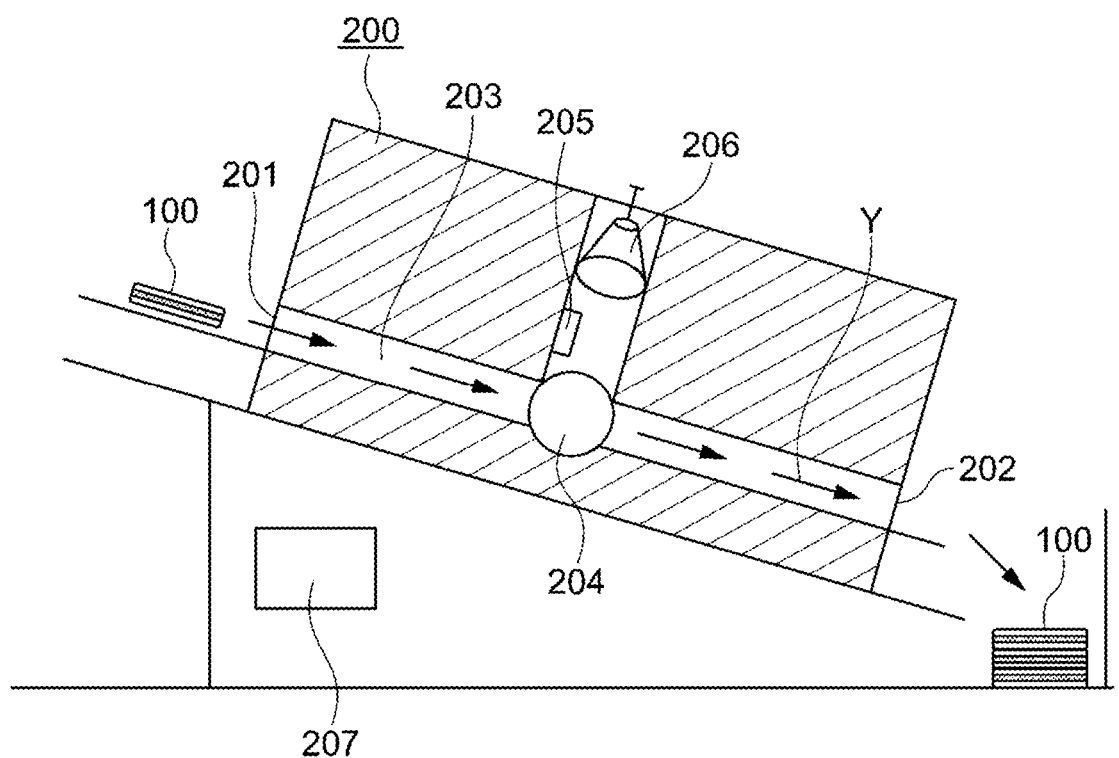
FIG. 6 is a side sectional view of an inspection apparatus for game tokens according to the embodiment of the present invention.

Referring to FIG. 6, an inspection apparatus 200 that inspects the game token 100 according to the embodiment of the present invention will be described next. The inspection apparatus 200 includes a path 203 having an inlet 201 and an outlet 202 through which the game token 100 can pass in the radial direction (the arrow Y direction). The path 203 is inclined, and the game token 100 passes through the path 203 in the arrow Y direction. The path 203 includes a chip type determination device 204 that determines the color of the striped pattern on the side surface of the game token 100 in the stacking direction by shooting the side surface, a mark reader 205 that reads the marks M printed by UV ink or carbon black ink and provided on the surface of the passing game token 100, a print inspection apparatus 206 that reads the print 103 provided on the surface of the game token from a direction perpendicular to the path 203, and a control device 207 for the overall apparatus. The control device 207 is configured to inspect whether the chip type determined by the chip type determination device 204 matches the information of the print representing a type, which is obtained from the print inspection apparatus 206.

The inspection apparatus 200 can inspect whether each print 103 on the manufactured game token 100 has been properly printed so as to match the chip type represented by the color of the striped pattern on the game token 100.

As described above, the management system, the game token, and the inspection apparatus according to the embodiment have the configurations described in the following annexes 1 to 11.

(Annex 1) A table game management system comprising: a card distributor that determines and displays a win-loss result on each game on a game table; a measurement device that measures types and number of game tokens placed on the game table; and a management control device that identifies and stores positions, types, and number of game tokens placed on the game table by a game participant by using a measurement result obtained by the measurement device in each game, wherein the game token has a multi-layer structure having plastic layers with a plurality of different colors stacked on each other, with a colored layer being provided at least intermediately, and white layers or light-colored layers being stacked on two sides of the intermediate colored layer, so as to be configured to form a striped pattern on a side surface in a stacking direction and allow identification of the type of game token according to the colored layer, and the management control device has a calculation function of determining participants in each game as a winner and a loser by using a win-loss result obtained from the card distributor and a measurement result on the positions, types, and number of game tokens placed by the game participants, and performing casino-side balance calculation on the game table for each game.

(Annex 2) The table game management system according to Annex 1, wherein the management control device comprises a function of determining the number of game tokens by measuring the number of colored layers, white layers, or light-colored layers of game tokens placed by each game participant.

(Annex 3) The table game management system according to Annex 1 or 2, further comprising a chip tray that holds the game tokens for each type, wherein the management control device is configured to measure a total amount of the game tokens on the chip tray by measuring types and number of the game tokens on the chip tray.

(Annex 4) A game token comprising an arrangement having plastic layers with a plurality of different colors stacked on each other, with a colored layer being provided at least intermediately, and white layers or light-colored layers being stacked on two sides of the colored layer, so as to form a striped pattern on a side surface in a stacking direction and allow identification of the type of game token according to the colored layer.

(Annex 5) The game token according to Annex 4, wherein a print indicating the type of game token is provided on a surface of the white layer or the light-colored layer, and a transparent layer is provided on an outermost layer, with the layers being bonded to each other by thermal compression to form at least a five-layer structure.

(Annex 6) The game token according to Annex 4 or 5, wherein a mark printed by UV ink or carbon black ink is provided on a surface of the white layer or the light-colored layer.

(Annex 7) The game token according to any one of Annexes 4 to 6, wherein the transparent layer on the outermost layer is embossed.

(Annex 8) The game token according any one of Annexes 4 to 7, wherein R chamfering is provided to an edge of the transparent layer on the outermost layer.

(Annex 9) The game token according to any one of Annexes 4 to 8, wherein the colored layer comprises a plurality of layers.

(Annex 10) The game token according to any one of Annexes 4 to 9, wherein the colored layer incorporates an RFID.

(Annex 11) An inspection apparatus that inspects a game token defined in Annexes 4 to 10, comprising: a path including an inlet and an outlet through which a game token is allowed to pass in a radial direction; a chip type determination device that determines a color of a striped pattern on a side surface of a game token in a stacking direction by shooting the game token passing through the path; a mark reader that reads a mark printed by UV ink or carbon black ink and provided on a surface of a passing game token; a print inspection apparatus that reads a print indicating a type, which is provided on a surface of a game token, from a direction perpendicular to the path; and a control device for an overall apparatus, wherein the control device is configured to inspect whether a chip type determined by the chip type determination device matches information of the print indicating a type obtained from the print inspection apparatus.

REFERENCE SIGNS LIST 1 game table
2 player 3 dealer
4 camera
5 image analysis device
6 measurement device
7 card distributor that determines and displays win-loss results on games
9 management control device
10 game token tray
100(T) game token
200 inspection apparatus

The invention claimed is:

1. A game token having a side face on which there is a pattern that includes a first color that is unique to a type of the game token and a second color that is not dependent on the type of the game token.

2. The game token according to claim 1, wherein the first color extends continuously about an entirety of the game token in a circumferential direction.

3. The game token according to claim 1, wherein the second color extends continuously about an entirety of the game token in a circumferential direction.

4. The game token according to claim 1, wherein the side face of the game token has a portion whose color changes in a thickness direction of the game token.

5. The game token according to claim 1, wherein the pattern is a striped pattern made up of at least one layer characterized by the first color and at least one layer characterized by the second color.

6. The game token according to claim 5, wherein the at least one layer characterized by the first color includes a plurality of layers characterized by the first color.

7. The game token according to claim 1, wherein the pattern is formed by layers characterized by the second color arranged on both sides of a layer characterized by the first color.

8. The game token according to claim 1, wherein the pattern of the game token is formed by a plastic layer of the first color and a plastic layer of the second color being laminated together.

9. The game token according to claim 8, wherein the plastic layer of the first color and the plastic layer of the second color thermocompression bonded.

10. The game token according to claim 1, further comprising a sign representing the type of the game token on the side face.

11. The game token according to claim 10, wherein the sign is formed of ultraviolet (UV) ink or carbon black ink.

12. The game token according to claim 1, wherein the game token includes an outermost layer that is transparent.

13. The game token according to claim 12, wherein the transparent layer is embossed.

14. The game token according to claim 12, wherein an end of the transparent layer is rounded.

15. The game token according to claim 1, comprising a Radio Frequency Identification (RFID) embedded therein.

* * * * *